United States Patent
Tai et al.

(10) Patent No.: US 12,366,991 B2
(45) Date of Patent: Jul. 22, 2025

(54) MULTI-CLUSTER SYSTEM AND MULTI-CLUSTER SYSTEM CONTROL METHOD

(71) Applicant: Realtek Semiconductor Corp., HsinChu (TW)

(72) Inventors: Chang-Hsien Tai, HsinChu (TW); Yun-Ru Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 35 days.

(21) Appl. No.: 18/523,905

(22) Filed: Nov. 30, 2023

(65) Prior Publication Data

US 2024/0319906 A1    Sep. 26, 2024

(30) Foreign Application Priority Data

Mar. 21, 2023    (TW) .................................. 112110328

(51) Int. Cl.
   *G06F 3/06*    (2006.01)
   *G06F 9/4401*    (2018.01)

(52) U.S. Cl.
   CPC .......... *G06F 3/0655* (2013.01); *G06F 3/0604* (2013.01); *G06F 3/0673* (2013.01); *G06F 9/4405* (2013.01)

(58) Field of Classification Search
   CPC .... G06F 3/0655; G06F 3/0604; G06F 3/0673; G06F 9/4405
   See application file for complete search history.

(56) References Cited

U.S. PATENT DOCUMENTS

| | | | | |
|---|---|---|---|---|
| 7,908,470 | B1 * | 3/2011 | Cavanna | G06F 9/4405 717/169 |
| 9,411,646 | B2 * | 8/2016 | Lei | G06F 9/4405 |
| 2010/0095089 | A1 * | 4/2010 | Kwon | G06F 15/167 711/149 |
| 2010/0262971 | A1 | 10/2010 | Kazumi | |
| 2014/0006714 | A1 | 1/2014 | Cherukuri | |
| 2017/0031619 | A1 * | 2/2017 | Luan | G06F 3/0673 |
| 2019/0108144 | A1 | 4/2019 | Fernando | |
| 2023/0068214 | A1 * | 3/2023 | Inglis | G06F 3/0635 |
| 2023/0334148 | A1 * | 10/2023 | Agam | G06F 21/57 |
| 2023/0401340 | A1 * | 12/2023 | Nobel | G06F 21/72 |

* cited by examiner

*Primary Examiner* — Sean D Rossiter
(74) *Attorney, Agent, or Firm* — Winston Hsu

(57) ABSTRACT

A multi-cluster system, comprising: a first cluster, comprising a first processor and a second processor; a second cluster, comprising a third processor and a fourth processor; and a storage system, comprising a first storage device comprising a first port and a second port. The first processor is coupled to the first port of the first storage device and the third processor is coupled to the second port of the first storage device, wherein the first processor and the third processor can read information stored in an identical address of the first storage device.

13 Claims, 8 Drawing Sheets

MULTI-CLUSTER SYSTEM AND MULTI-CLUSTER SYSTEM CONTROL METHOD

BACKGROUND OF THE INVENTION

1. Field of the Invention

The present invention relates to a multi-cluster system and a multi-cluster system control method, and particularly relates to a multi-cluster system and a multi-cluster system control method which allow processors in different clusters to read an identical storage device to save waiting time.

2. Description of the Prior Art

For a conventional computer, clusters are often used to speed up data processing. A cluster usually comprises at least one bus and a plurality of processors, so that different processors can simultaneously process different tasks to increase the overall processing speed of the computer. In a multi-cluster system, when a booting action is to be performed, different processors are sued to perform their booting operations sequentially, thus requires a longer boot time. Further, if firmware of different processors needs to be updated, the different processors perform their updating operations sequentially, thus requires a longer firmware update time. With the progress and complexity of the operating system used by the computer, more firmware needs to be updated, and therefore a longer firmware update time is also required. In such case, the computer lag issue becomes more serious.

SUMMARY OF THE INVENTION

One embodiment of the present invention is to provide a multi-cluster system which can improve delay problems.

Another embodiment of the present invention is to provide a multi-cluster system control method which can improve delay problems.

One embodiment of the present invention discloses a multi-cluster system, comprising: a first cluster, comprising a first processor and a second processor; a second cluster, comprising a third processor and a fourth processor; and a storage system, comprising a first storage device comprising a first port and a second port. The first processor is coupled to the first port of the first storage device and the third processor is coupled to the second port of the first storage device, wherein the first processor and the third processor can read information stored in an identical address of the first storage device.

Another embodiment of the present invention discloses a multi-cluster system control method, applied to a multi-cluster system comprising a first cluster and a second cluster, the first cluster comprising a first processor and a second processor and the second cluster comprising a third processor and a fourth processor, the multi-cluster system control method comprising: (a) coupling the first processor to a first port of a first storage device; (b) coupling the third processor to a second port of the first storage device; and (c) reading information stored in an identical address of the first storage device by the first processor and the third processor.

In view of above-mentioned embodiments, different processors in different clusters can read the same information in the same storage device at the same time, so that the delay problem of reading in turn in the prior art can be improved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concepts of the present invention. Please also note that in the following embodiments, two clusters that respectively comprise two processors are used for illustration. Also, a storage system comprising one or two storage devices is also used for illustration. However, the multi-cluster system provided by the present invention may comprise other numbers of clusters, processors or storage devices. Additionally, the term "first", "second", "third" in following descriptions are only for the purpose of distinguishing different one elements, and do not mean the sequence of the elements. For example, a first device and a second device only mean these devices can have the same structure but are different devices.

Figure 1:
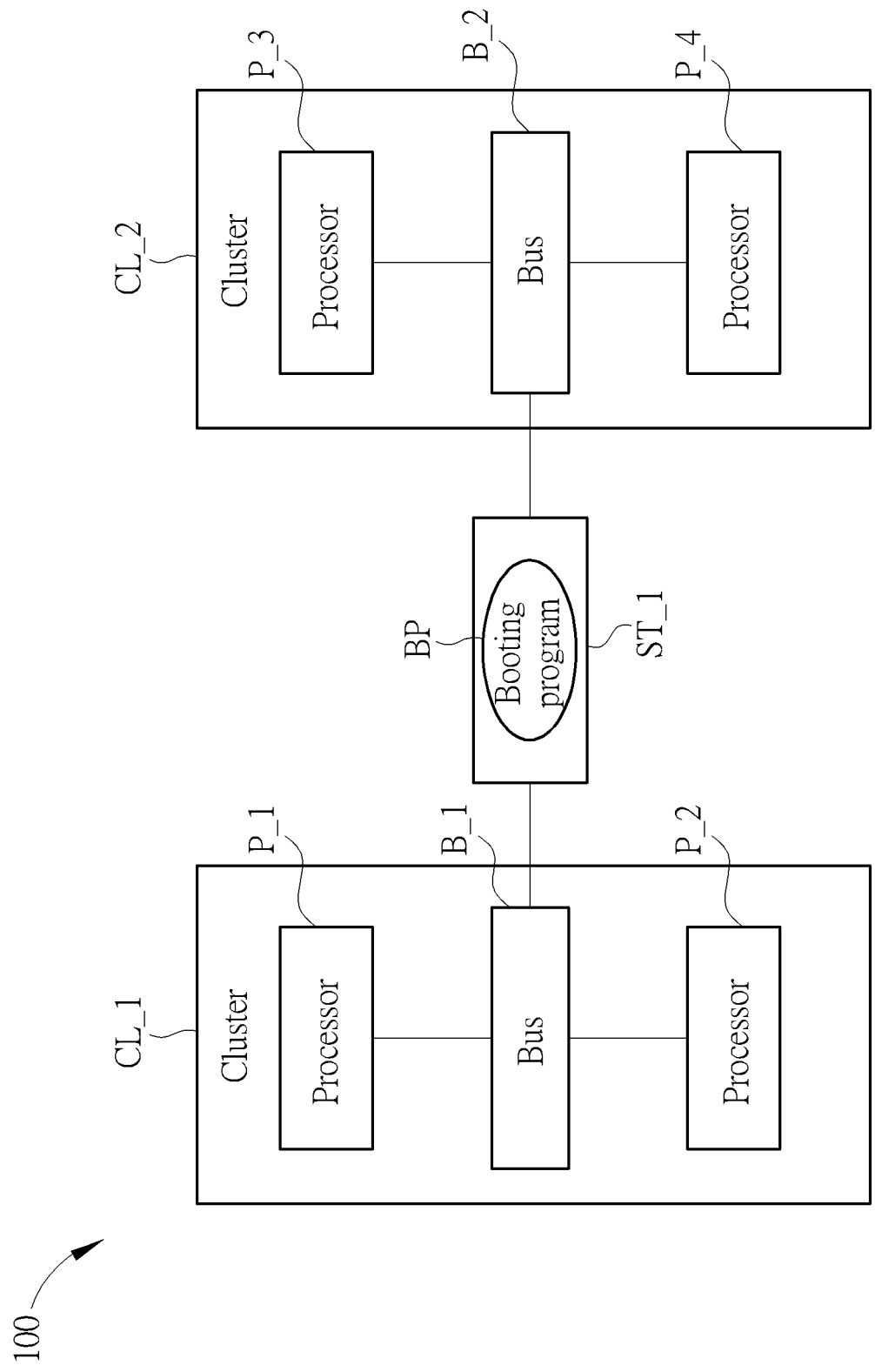
FIG. 1 is a block diagram illustrating a cluster system according to one embodiment of the present invention.

FIG. 1 is a block diagram illustrating a cluster system 100 according to one embodiment of the present invention. As shown in FIG. 1, the multi-cluster system comprises a first cluster CL_1 and a second cluster CL_2. The first cluster CL_1 comprises a first processor P_1, a second processor P_2 and a bus B_1. The second cluster CL_2 comprises a third processor P_3, a fourth processor P_4 and a bus B_2. In one embodiment, the first processor P_1, the second processor P_2, the third processor P_3 and the fourth processor P_4 are CPU (central processing unit), but may also be other processors. In one embodiment, the first processor P_1 and the third processor P_3 are primary processors for assigning tasks to the second processor P_2 and the fourth processor P_4 respectively.

The multi-cluster system 100 further comprises a storage system comprising at least one storage device. In the embodiment in FIG. 1, the storage system only comprises a first storage device ST_1, which can be an SRAM or any other memory. The first storage device comprises a first port and a second port. The first processor P_1 is coupled to the first port of the first storage device ST_1 through the bus B_1, and the third processor P_3 is coupled to the second port of the storage device ST_1 through the bus B_2. Also, the first processor P_1 and the third processor P_3 can read the information stored in an identical address in the first storage device ST_1. In other words, the first processor P_1 and the third processor P_3 can read the same piece of information in the first storage device ST_1. In one embodiment, the first processor P_1 and the third processor P_3 do not read the same piece of information in the storage device ST_1 at the same time. In another embodiment, time of the first processor P_1 reading the information stored in the identical address of the first storage device and the time of the third processor P_3 reading the information stored in the identical address of the first storage device are partially identical (that is, partial reading operations overlap) or totally identical (that is, simultaneously read). The information in the first storage device ST_1 read by the first processor P_1 and the third processor P_3 can be various types of information. In the embodiment of FIG. 1, the first storage device ST_1 stores a booting program BP. The first processor P_1 and the third processor P_3 can read the booting program BP stored in the first storage device ST_1 to perform the booting operation of the multi-cluster system 100. In the embodiment in FIG. 1 and the embodiments below, other processors other than the first processor P_1 and the third processor P_3 can also perform the same operations as the first processor P_1 and the third processor P_3.

Figure 2:
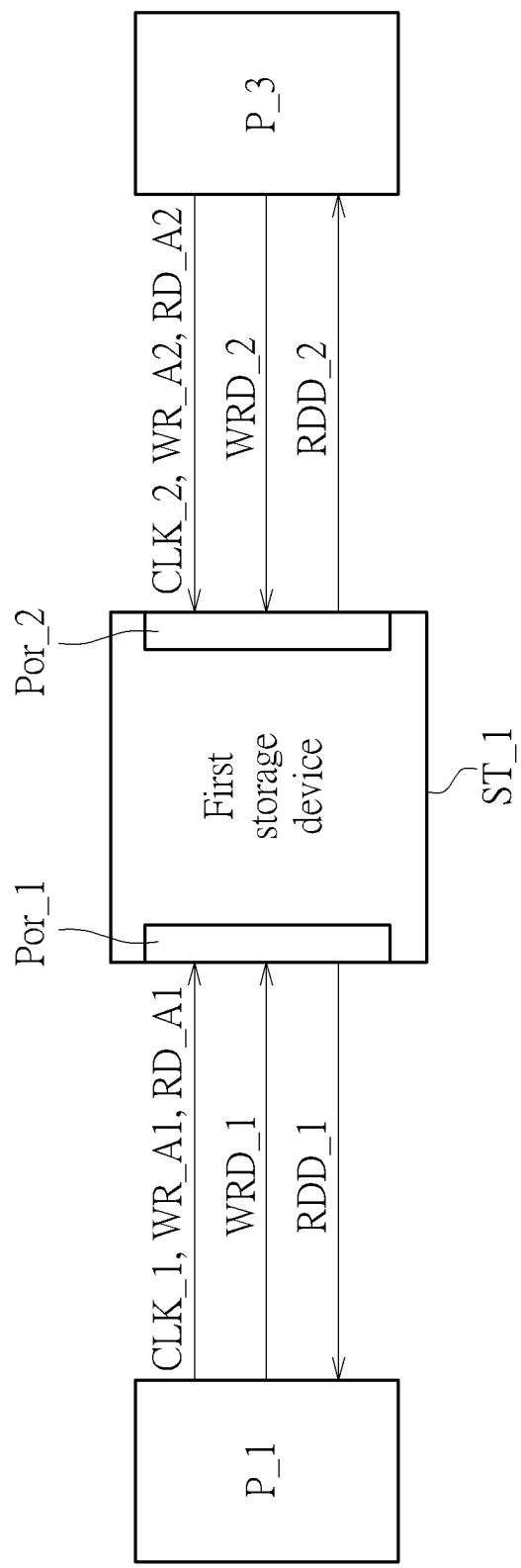
FIG. 2 is a block diagram illustrating detail structures of the storage device in FIG. 1, according to one embodiment of the present invention.

FIG. 2 is a block diagram illustrating detail structures of the first storage device ST_1 in FIG. 1, according to one embodiment of the present invention. As shown in FIG. 1, the first storage device ST_1 comprises a first port Por_1 and a second port Por_2. The first port Por_1 can receive the clock signal CLK_1, the write address WR_A1, the read address RD_A1, and the data WRD_1 to be written from the first processor P_1. In addition, the first port Por_1 can output the data RDD_1 to be read of the first processor P_1. The second port Por_2 can receive the clock signal CLK_2, the write address WR_A2, the read address RD_A2, and the data WRD_2 to be written from the third processor P_3. In addition, the second port Por_2 can output the data RDD_2 to be read of the third processor P_3.

As mentioned above, the first processor P_1 and the third processor P_3 can read information at an identical address in the first storage device ST_1. Therefore, the read addresses RD_A1 and RD_A2 may be the same or different, and the data RDD_1 and RDD_2 may be the same or different. Further, in one embodiment, the first processor P_1 and the third processor P_3 can write information at an identical address in the first storage device ST_1. Therefore, the write addresses WR_A1 and WR_A2 may be the same or different, and the data WRD_1 and WRD_2 may be the same or different.

Figure 3:
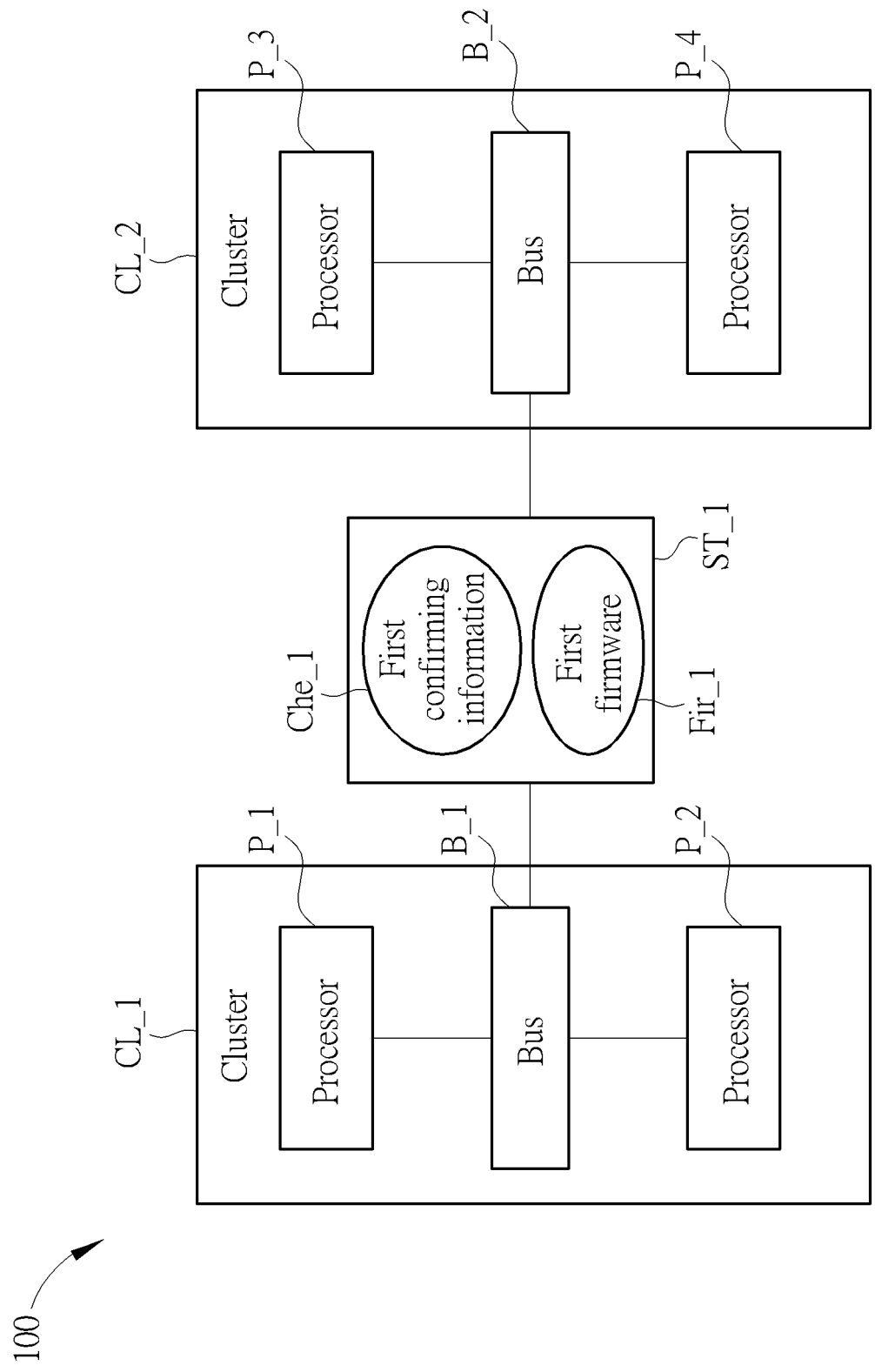
FIG. 3, FIG. 4 are block diagrams illustrating multi-cluster systems according to different embodiments of the present invention.
Figure 4:
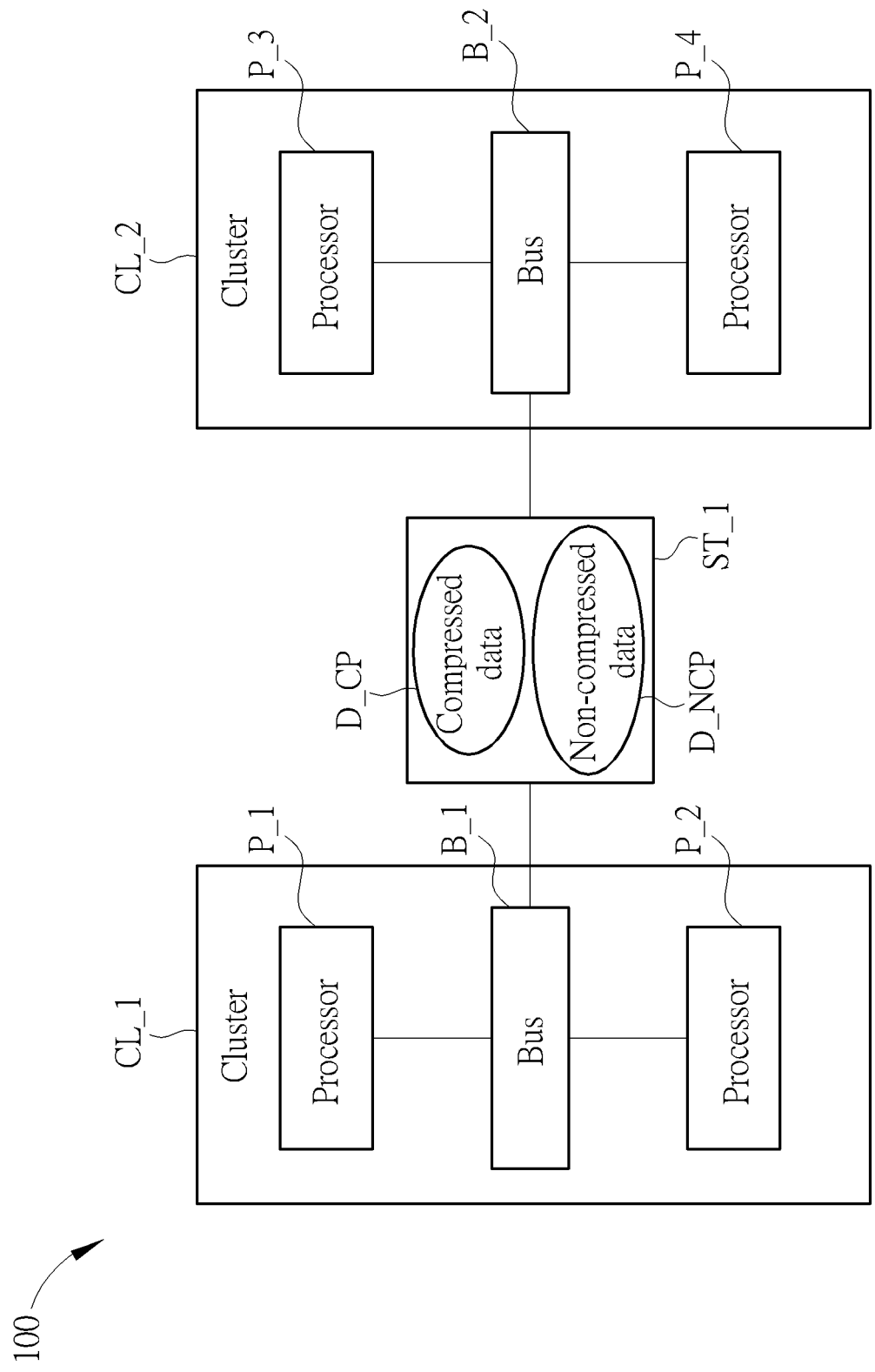

As mentioned above, the information stored in the first storage device ST_1 can be various kinds of information. FIG. 3, FIG. 4 are block diagrams illustrating multi-cluster systems according to different embodiments of the present invention. In the embodiment of FIG. 3, the first storage device ST_1 comprises the first confirming information Che_1 and the first firmware Fir_1. The first processor P_1 and the third processor P_3 can read the first confirming information Che_1 to check if the first firmware Fir_1 corresponds to the first processor P_1 or the third processor P_3. For example, the first processor P_1 can check whether the first firmware Fir_1 is the firmware to be updated by the first processor P_1 according to the first confirming information Che_1. If yes, the first processor P_1 reads and updates the first firmware Fir_1, otherwise the first processor P_1 does not read the first firmware Fir_1. In one embodiment, the first processor P_1 is a primary processor and the first processor P_1 determines the first firmware Fir_1 is the firmware to be updated by the second processor P_2 according to the first confirming information Che_1, then the first processor P_1 notifies the second processor P_2 to read and update the first firmware Fir_1. The operations of the third processor P_3 may be the same as those of the first processor P_1, thus detail descriptions thereof are omitted for brevity here.

In the embodiment of FIG. 4, the first storage device ST_1 comprises compressed data D_CP and non-compressed data D_NCP. The non-compressed data D_NCP is the decompressed data of the compressed data D_CP. That is to say, the compressed data D_CP is generated after the non-compressed data D_NCP is compressed. Therefore, in the embodiment shown in FIG. 4, a compressor can compress the non-compressed data D_NCP to generate the compressed data D_CP, and then store the compressed data D_CP and the non-compressed data D_NCP in the first storage device ST_1. The first processor P_1 and the third processor P_3 can read the compressed data D_CP and decompress it to generate decompressed data. The content of the decompressed data here can be the same as that of the non-compressed data D_NCP, but some content may be different due to the compression/decompression algorithm.

The first processor P_1 and the third processor P_3 can respectively check if the decompressed data corresponds to the second processor P_2 and the fourth processor P_4, so as to respectively control the second processor P_2 and the fourth processor P_4 to read the non-compressed data D_NCP in the first storage device ST_1. For example, after the first processor P_1 reads the compressed data D_CP and decompresses it to generate decompressed data, the first processor P_1 determines whether the decompressed data is the data that the second processor P_2 can read or want to read. If yes, the first processor P_1 notifies the second processor P_2 to read the non-compressed data D_NCP, otherwise the second processor P_2 does not read the non-compressed data D_NCP. Similarly, after the third processor P_3 can read the compressed data D_CP and decompress it to generate decompressed data, the third processor P_3 determines whether the decompressed data is the data that the fourth processor P_4 can read or want to read. If yes, the third processor P_3 notifies the fourth processor P_4 to read the non-compressed data D_NCP, otherwise the fourth processor P_4 does not read the non-compressed data D_NCP. By this way, some processors can be allowed to read the compressed data D_CP with a small amount of data, and other processors can be prevented from reading unnecessary non-compressed data D_NCP. Thus, the bandwidth used by the multi-cluster system 100 for accessing data can be reduced, and the processing speed of the multi-cluster system 100 can also be increased.

Figure 5:
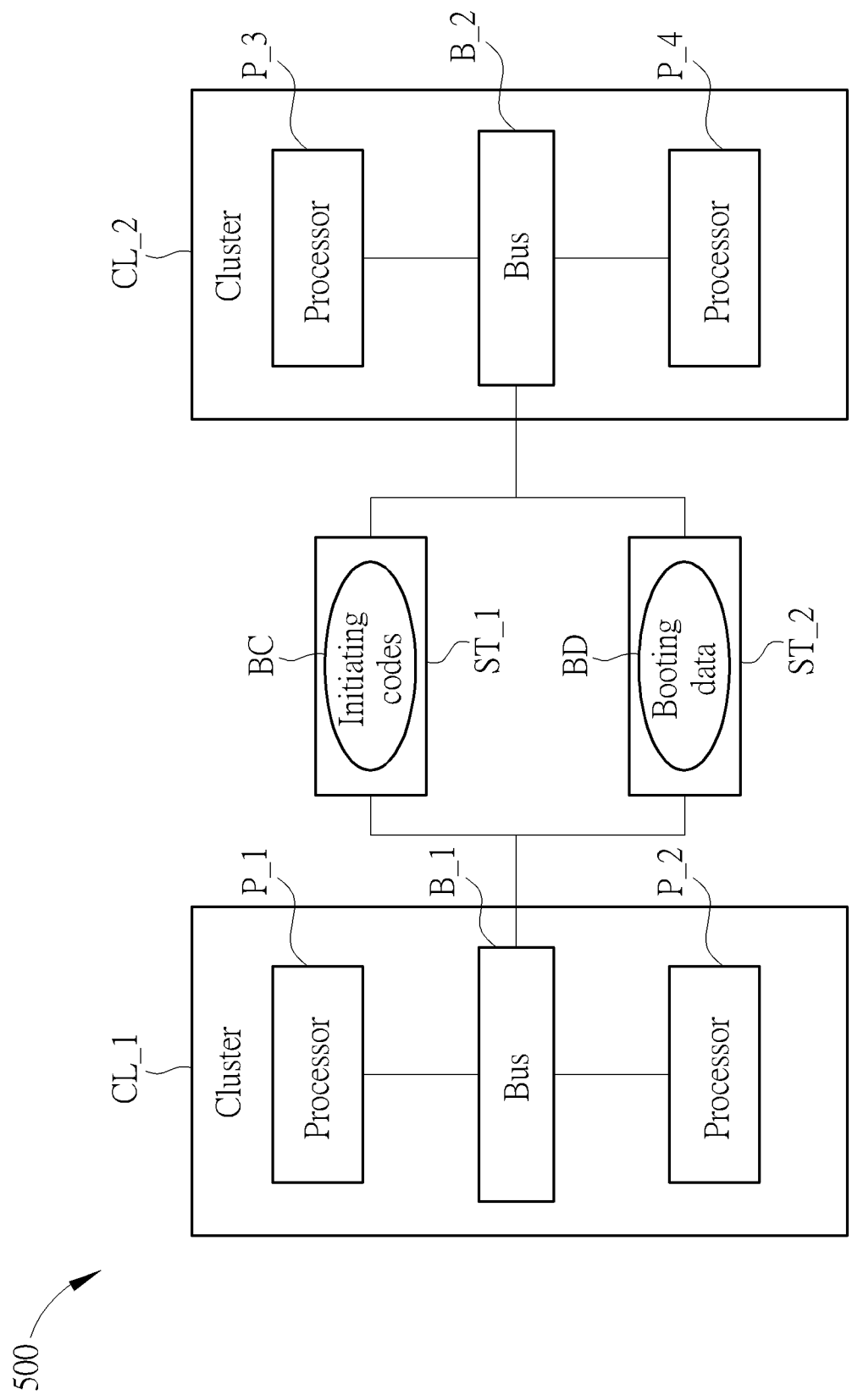
FIG. 5, FIG. 6 and FIG. 7 are block diagrams illustrating multi-cluster systems which comprises a plurality of storage devices, according to different embodiments of the present invention.
Figure 6:
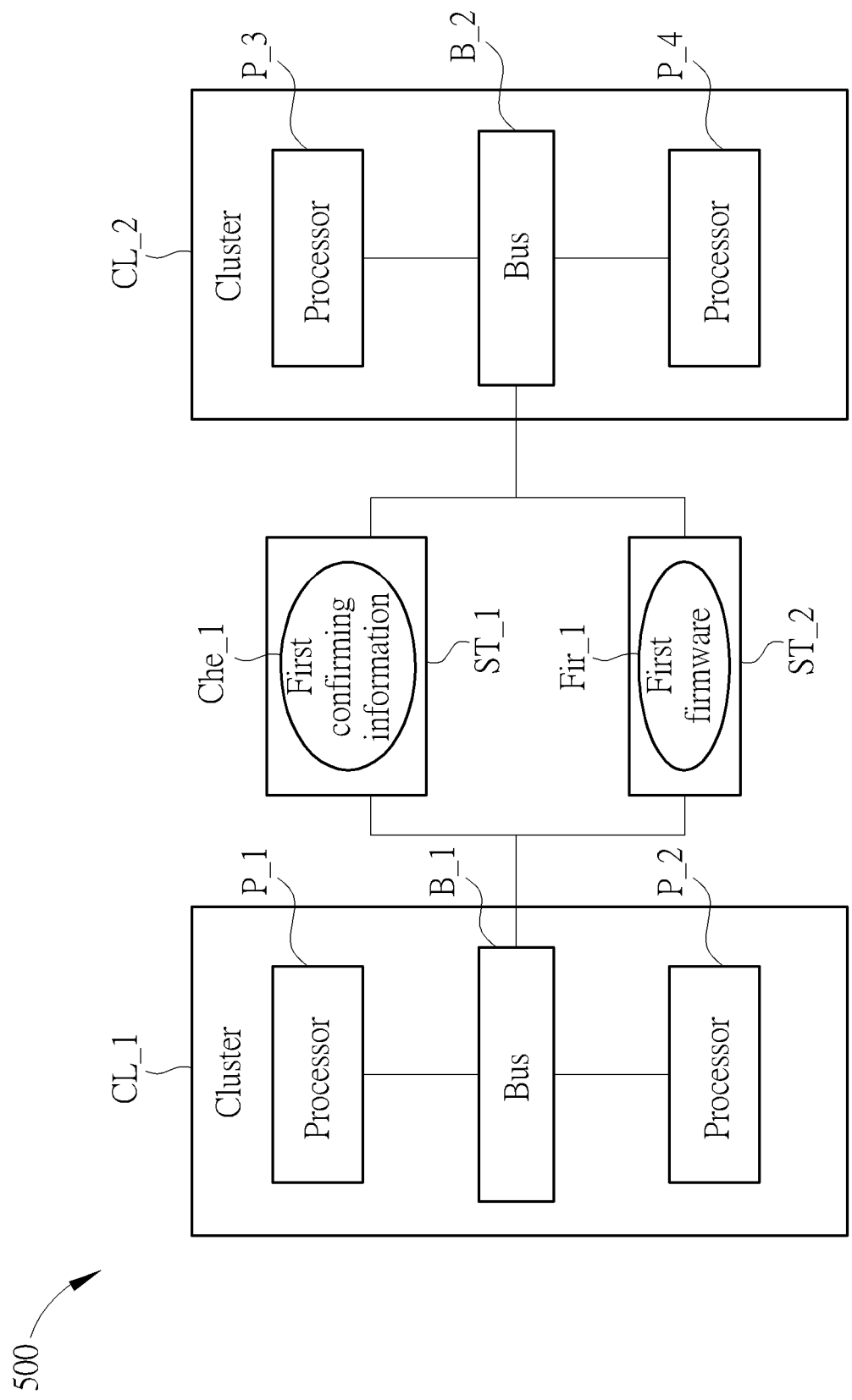
Figure 7:
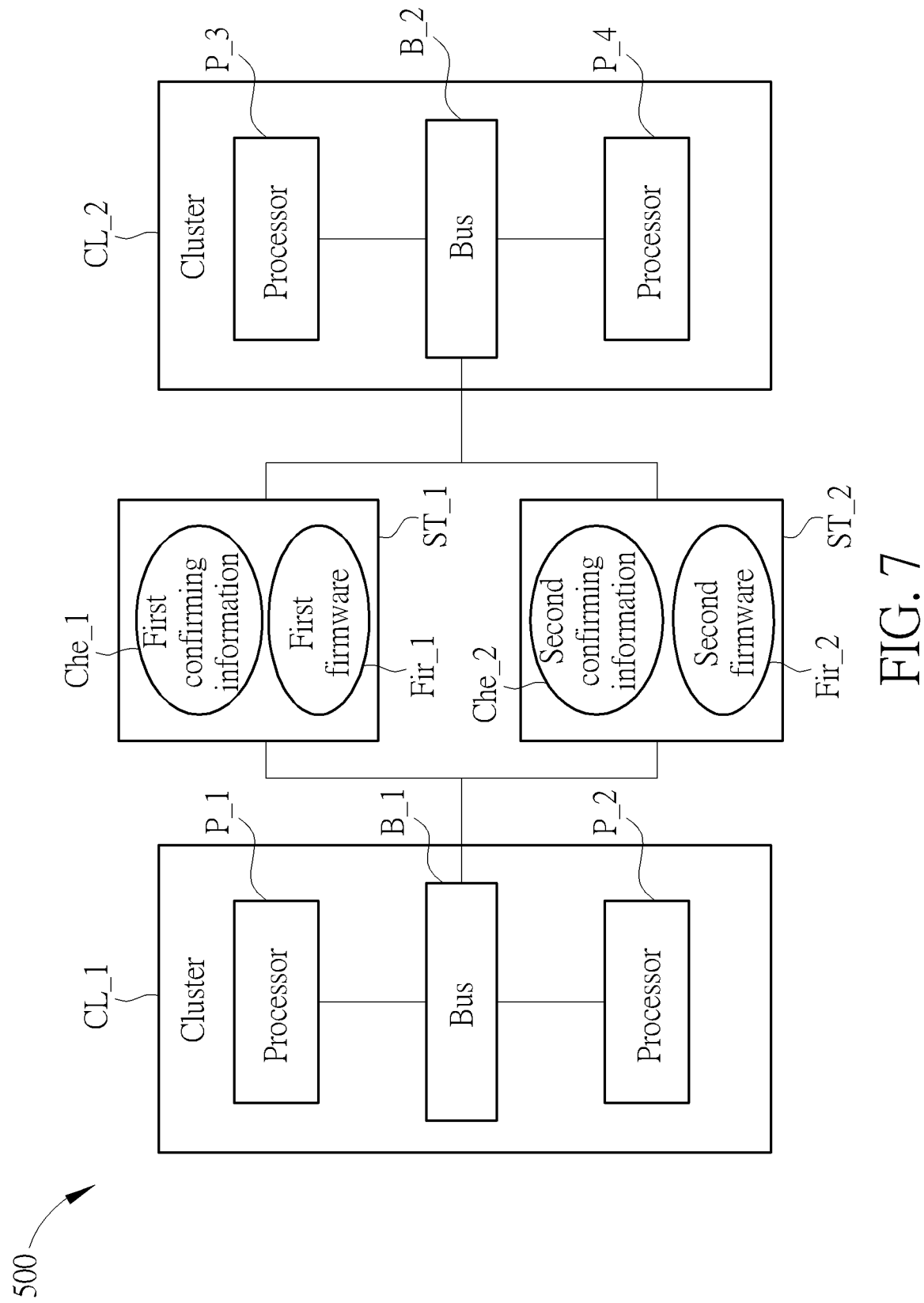

In the foregoing embodiments, the multi-cluster system 100 comprises only one storage device, however, the multi-cluster system provided by the present invention may also comprise multiple storage devices. FIG. 5, FIG. 6 and FIG. 7 are block diagrams illustrating multi-cluster systems which comprises a plurality of storage devices, according to different embodiments of the present invention. In the embodiments of FIG. 5, FIG. 6 and FIG. 7, in addition to the first storage device ST_1, the storage system further comprises a second storage device ST_2. The second storage device ST_2 comprises a first port and a second port. The first processor is coupled to the first port of the second storage device ST_2 and the third processor P_3 is coupled to the second port of the second storage device ST_2. Also, the first processor P_1 and the third processor P_3 can read the information stored in an identical address in the second storage device ST_2. That is, the second storage device ST_2 may have the structure and operations of the first storage device ST_1.

In the embodiments of FIG. 5, FIG. 6 and FIG. 7, the information stored in the first storage device ST_1 in the above embodiments can be dispersed in the first storage device ST_1 and the second storage device ST_2. The embodiment in FIG. 5 corresponds to the embodiment in FIG. 1. In the embodiment in FIG. 1, the first storage device ST_1 stores the booting program BP. In the embodiment shown in FIG. 5, the first storage device ST_1 comprises the initiating codes BC of a booting program BP and the second storage device ST_2 comprises the booting data BD which the booting operation needs. The first processor P_1 and the third processor P_3 can read the initiating codes BC in the first storage device ST_1 and the corresponding booting data BD in the second storage device ST_2 to perform the booting operation.

The embodiment of FIG. 6 corresponds to the embodiment of FIG. 3. In the embodiment of FIG. 3, the first storage device ST_1 stores the first confirming information Che_1 and the first firmware Fir_1. In the embodiment shown in FIG. 6, the first confirming information Che_1 and the first firmware Fir_1 are dispersed in the first storage device ST_1 and the second storage device ST_2. Similar to the embodiment in FIG. 3, in the embodiment in FIG. 6, the first processor P_1 and the third processor P_3 can read the first confirming information Che_1 in the first storage device ST_1 to check if the first firmware Fir_1 in ST_2 in the second storage device corresponds to the first processor P_1 or the third processor P_3. For example, the first processor P_1 can check whether the first firmware Fir_1 is the firmware to be updated by the first processor P_1 according to the first confirming information Che_1. If yes, the first processor P_1 reads and updates the first firmware Fir_1, otherwise the first processor P_1 does not read the first firmware Fir_1. In one embodiment, if the first processor P_1 is the primary processor and the first processor P_1 determines that the first firmware Fir_1 is the firmware to be updated by the second processor P_2 according to the first confirming information Che_1, the first processor P_1 notifies the second processor P_2 to read and update the first firmware Fir_1. The operations of the third processor P_3 may be the same as those of the first processor P_1, thus detail descriptions thereof are omitted for brevity here.

In the embodiment shown in FIG. 7, the first storage device ST_1 and the second storage device ST_2 store different sets of confirming information and firmware. For more detail, the first storage device ST_1 stores the first confirming information Che_1 and the first firmware Fir_1, and the second storage device ST_2 stores the second confirming information Che_2 and the second firmware Fir 2. The operations of determining the firmware based on the confirming information in the first storage device ST_1 and the second storage device ST_2 in FIG. 7 is the same as the operation of determining the firmware according to the confirming information in the first storage device ST_1 in FIG. 3, thus are not repeated here. Different sets of confirming information and firmware may correspond to different devices coupled to the processor, or correspond to different operations of the same device coupled to the processor. For example, if the multi-cluster system 500 shown in FIG. 7 is used in a vehicle, different sets of confirming information and firmware can correspond to the lights and air conditioners, or correspond to the acceleration mechanism and deceleration mechanism of the speed control system.

According to above-mentioned embodiments, a multi-cluster system control method can be obtained, which is used in a multi-cluster system comprising a first cluster and a second cluster (such as the first cluster CL_1 and the second cluster CL_2 in the above-mentioned embodiments). The first cluster comprises a first processor and a second processor (for example, the first processor P_1 and the second processor P_2), and the second cluster comprises a third processor and a fourth processor (for example, the third processor P_3 and the fourth processor P_4).

Figure 8:
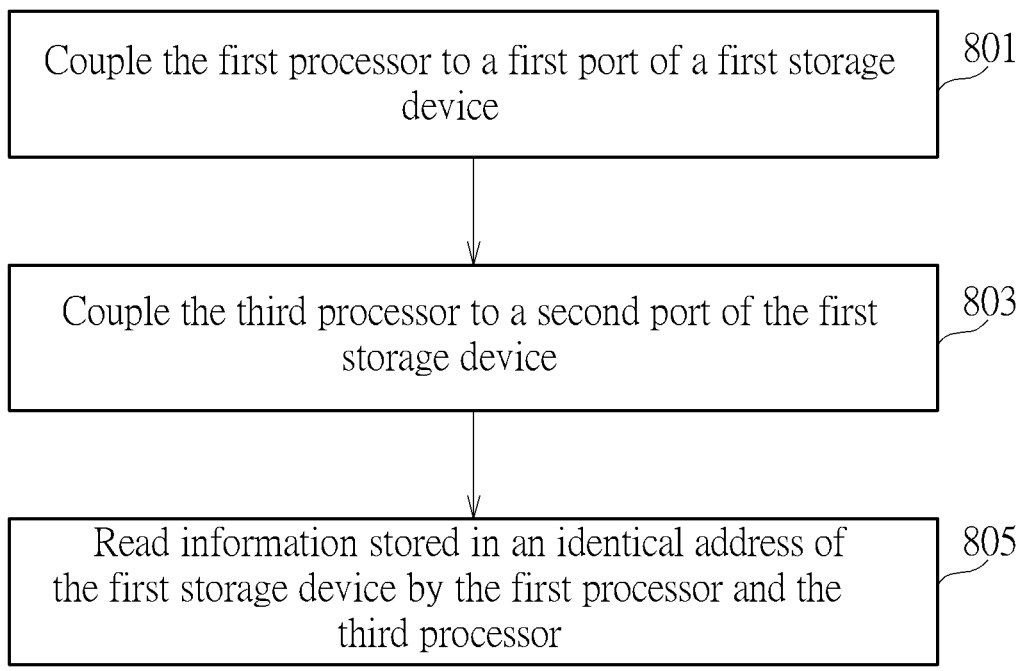
FIG. 8 is a flow chart illustrating a multi-cluster system control method according to one embodiment of the present invention.

FIG. 8 is a flow chart illustrating a multi-cluster system control method according to one embodiment of the present invention, which comprises the following steps:

Step 801

Couple the first processor to a first port of a first storage device (e.g., the first storage device ST_1).

Step 803

Couple the third processor to a second port of the first storage device

Step 805

Read information stored in an identical address of the first storage device by the first processor and the third processor.

Detail steps are described in above-mentioned embodiments, thus are omitted for brevity here.

In view of above-mentioned embodiments, different processors in different clusters can read the same information in the same storage device at the same time, so that the delay problem of reading in turn in the prior art can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-cluster system, comprising:
a first cluster, comprising a first processor and a second processor;
a second cluster, comprising a third processor and a fourth processor; and
a storage system, comprising a first storage device comprising a first port and a second port;
wherein the first processor is coupled to the first port of the first storage device and the third processor is coupled to the second port of the first storage device, wherein the first processor and the third processor can read information stored in an identical address of the first storage device;
wherein the storage system further comprises a second storage device comprising a first port and a second port, wherein the first processor is coupled to the first port of the second storage device and the third processor is coupled to the second port of the second storage device, wherein the first processor and the third processor can read information stored in an identical address of the second storage device;
wherein the first storage device comprises first confirming information and the second storage device comprises first firmware, wherein the first processor and the third processor can read the first confirming information to check if the first firmware corresponds to the first processor or the third processor.

2. The multi-cluster system of claim 1, wherein the first storage device comprises a booting program, wherein the first processor and the third processor can read the booting program to perform a booting operation.

3. The multi-cluster system of claim 1, wherein the first storage device comprises compressed data and non-compressed data, wherein the non-compressed data is data acquired by decompressing the compressed data, wherein the first processor and the third processor can read and decompress the compressed data to generate de-compressed data, wherein the first processor and the third processor further respectively check if the de-compressed data corresponds to the second processor and the fourth processor, to respectively control the second processor and the fourth processor to read the non-compressed data.

4. The multi-cluster system of claim 1, wherein the first storage device comprises initiating codes of a booting program and the second storage device comprises booting data which a booting operation needs, wherein the first processor and the third processor can read the initiating code and the booting data to perform a booting operation.

5. The multi-cluster system of claim 1, wherein the storage device is a SRAM.

6. The multi-cluster system of claim 1, wherein time of the first processor reading the information stored in the identical address of the first storage device and the time of the third processor reading the information stored in the identical address of the first storage device partially overlap or are totally identical.

7. A multi-cluster system control method, applied to a multi-cluster system comprising a first cluster and a second cluster, the first cluster comprising a first processor and a second processor and the second cluster comprising a third processor and a fourth processor, the multi-cluster system control method comprising:
 (a) coupling the first processor to a first port of a first storage device;
 (b) coupling the third processor to a second port of the first storage device; and
 (c) reading information stored in an identical address of the first storage device by the first processor and the third processor;
wherein the first storage device comprises first confirming information and first firmware, wherein the step (c) uses the first processor and the third processor to read the first confirming information to check if the first firmware corresponds to the first processor or the third processor.

8. The multi-cluster system control method of claim 7, wherein the first storage device comprises a booting program, wherein the step (c) uses the first processor and the third processor to read the booting program to perform a booting operation.

9. The multi-cluster system control method of claim 7, wherein the first storage device comprises compressed data and non-compressed data, wherein the non-compressed data is data acquired by decompressing the compressed data, wherein the step (c) comprises:
 using the first processor and the third processor to read and decompress the compressed data to generate de-compressed data; and
 using the first processor and the third processor to respectively check if the de-compressed data corresponds to the second processor and the fourth processor, to respectively control the second processor and the fourth processor to read the non-compressed data.

10. The multi-cluster system control method of claim 7, further comprising:
 coupling the first processor to a first port of a second storage device;
 coupling the third processor to a second port of the second storage device; and
 reading information stored in an identical address of the second storage device by the first processor and the third processor.

11. The multi-cluster system control method of claim 10, wherein the first storage device comprises initiating codes of a booting program and the second storage device comprises booting data which a booting operation needs, wherein the step (c) uses the first processor and the third processor to read the initiating code and the booting data to perform a booting operation.

12. The multi-cluster system control method of claim 7, wherein the storage device is a SRAM.

13. The multi-cluster system control method of claim 7, wherein time of the first processor reading the information stored in the identical address of the first storage device and the time of the third processor reading the information stored in the identical address of the first storage device partially overlap or are totally identical.

* * * * *